(12) United States Patent
Nestler

(10) Patent No.: US 10,454,326 B2
(45) Date of Patent: Oct. 22, 2019

(54) SYNCHRONOUS MOTOR

(71) Applicant: SEW-EURODRIVE GMBH & CO. KG, Bruchsal (DE)

(72) Inventor: Helmut Nestler, Bruchsal (DE)

(73) Assignee: SEW—EURODRIVE GMBH & CO. KG, Bruchsal (DE)

( * ) Notice: Subject to any disclaimer, the term of this patent is extended or adjusted under 35 U.S.C. 154(b) by 402 days.

(21) Appl. No.: 15/237,275

(22) Filed: Aug. 15, 2016

(65) Prior Publication Data

US 2017/0194825 A1 Jul. 6, 2017

Related U.S. Application Data

(63) Continuation of application No. 14/126,705, filed as application No. PCT/EP2012/001972 on May 8, 2012, now Pat. No. 9,419,505.

(30) Foreign Application Priority Data

Jun. 17, 2011 (DE) .................. 10 2011 106 628

(51) Int. Cl.
*H02K 21/12* (2006.01)
*H02K 1/27* (2006.01)
*H02K 21/14* (2006.01)
*H02K 29/03* (2006.01)

(52) U.S. Cl.
CPC .......... *H02K 1/2706* (2013.01); *H02K 1/278* (2013.01); *H02K 21/14* (2013.01); *H02K 29/03* (2013.01); *H02K 2201/03* (2013.01); *H02K 2213/03* (2013.01)

(58) Field of Classification Search
CPC .... H02K 1/278; H02K 21/14; H02K 2201/03; H02K 29/03
USPC .......................... 310/156.12, 156.14, 156.48
See application file for complete search history.

(56) References Cited

U.S. PATENT DOCUMENTS

| 5,162,685 A | 11/1992 | Yamaguchi et al. |
|---|---|---|
| 5,397,951 A | 3/1995 | Uchida et al. |
| 7,592,729 B2 | 9/2009 | Hahn |
| 9,515,539 B2* | 12/2016 | Prudham ................ H02K 1/146 |
| 2007/0170800 A1 | 7/2007 | Okubo |

(Continued)

FOREIGN PATENT DOCUMENTS

| DE | 92 16 117 U1 | 3/1993 |
|---|---|---|
| DE | 10053692 A1 | 5/2002 |

(Continued)

OTHER PUBLICATIONS

International Preliminary Report on Patentability and Written Opinion of the International Searching Authority in PCT/EP2012/001972, dated Apr. 8, 2014.

(Continued)

*Primary Examiner* — Thanh Lam
(74) *Attorney, Agent, or Firm* — Hunton Andrews Kurth LLP

(57) ABSTRACT

A synchronous motor includes a stator with a stator winding, and a rotor on which magnetic poles made of permanent-magnetic material are formed, each pole having a cambered outer contour, especially an outer contour cambered radially outwards, in particular, 2×p individual poles being salient in the circumferential direction, p being the number of pole pairs.

17 Claims, 1 Drawing Sheet

(56) References Cited

U.S. PATENT DOCUMENTS

| | | |
|---|---|---|
| 2009/0015090 A1 | 1/2009 | Kimura et al. |
| 2009/0315424 A1 | 12/2009 | Vollmer |
| 2010/0133940 A1 | 6/2010 | Grossmann et al. |
| 2010/0244607 A1 | 9/2010 | Fujimoto et al. |
| 2010/0277026 A1 | 11/2010 | Yamaguchi et al. |
| 2011/0043070 A1 | 2/2011 | Evans et al. |
| 2012/0025654 A1 | 2/2012 | Bach et al. |

FOREIGN PATENT DOCUMENTS

| | | |
|---|---|---|
| DE | 10 2004 026 453 A1 | 12/2004 |
| DE | 102005019370 A1 | 11/2006 |
| DE | 10 2007 041 099 A1 | 3/2009 |
| DE | 10 2009 054 069 A1 | 10/2010 |
| DE | 10 2010 001 481 A1 | 8/2011 |
| DE | 10 2010 050 934 A1 | 5/2012 |
| EP | 0392028 A1 | 10/1990 |
| EP | 2073352 A1 | 6/2009 |
| EP | 2192670 A1 | 6/2010 |
| FR | 2802724 A1 | 6/2001 |
| JP | H02111238 A | 4/1990 |
| JP | H02211031 A | 8/1990 |
| JP | H09117081 A | 5/1997 |
| JP | 2004194419 A | 7/2004 |
| WO | WO 2010/130894 | 11/2010 |

OTHER PUBLICATIONS

International Search Report in PCT/EP2012/001972, dated Feb. 14, 2014.

\* cited by examiner

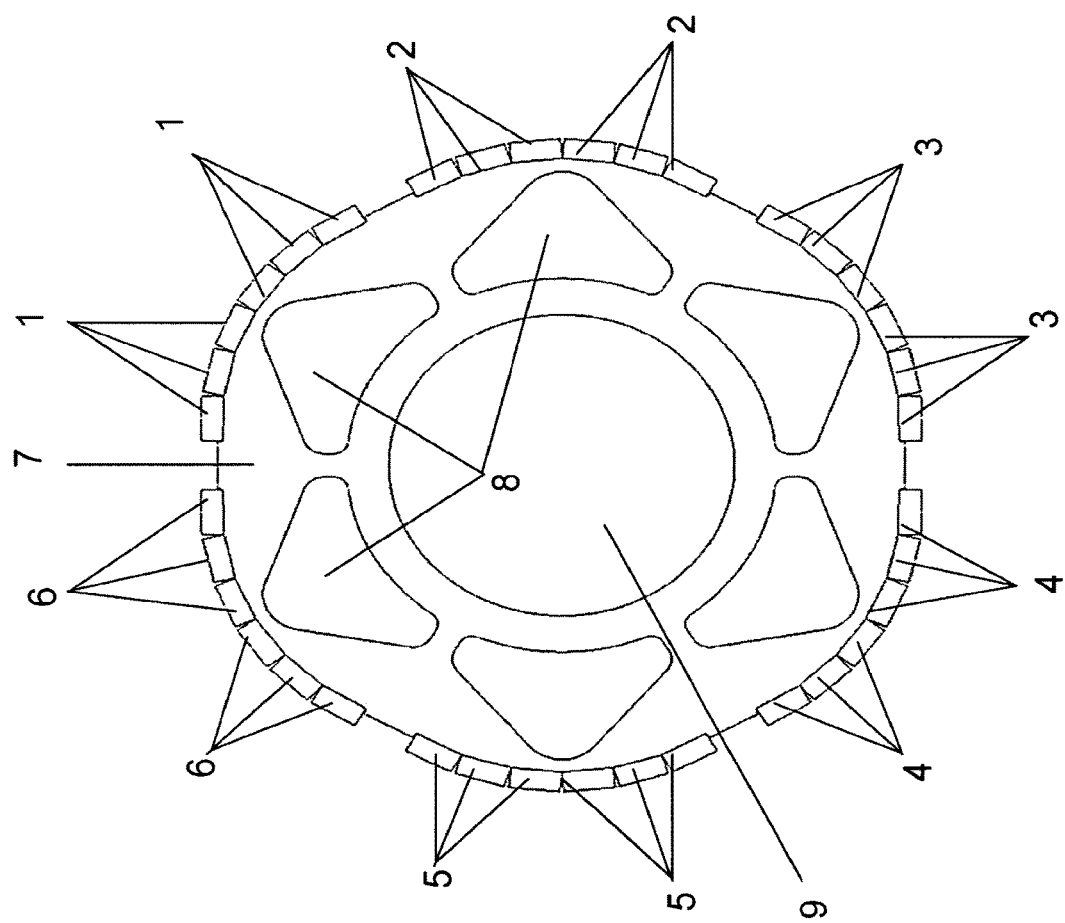

SYNCHRONOUS MOTOR

CROSS REFERENCE TO RELATED APPLICATIONS

This application is a continuation of U.S. patent application Ser. No. 14/126,705 filed on Dec. 16, 2013, which is a national phase of International Application No. PCT/EP2012/001972 filed on May 8, 2012, which claims priority to German Patent Application No. 10 2011 106 628.8 filed on Jun. 17, 2011, each of which is expressly incorporated herein in its entirety by reference thereto.

FIELD OF THE INVENTION

The present invention relates to a synchronous motor.

BACKGROUND INFORMATION

In the case of a rotor of a synchronous motor, it is well-known to use a punch/stacked laminated core, at whose outer surface permanent magnets are provided.

SUMMARY

Example embodiments of the present invention provide a a synchronous motor which is easy to control.

According to example embodiments of the present invention, a synchronous motor has a stator having a stator winding, and a rotor on which magnetic poles made of permanent-magnetic material are formed, each pole having a cambered outer contour, especially an outer contour cambered radially outwards, in particular, 2×p poles, e.g., especially individual poles, being salient in the circumferential direction, p being the number of pole pairs.

This has the advantage that in the case of one pole of a pole pair, the permanent magnets are disposed so as to be magnetized radially outwards, and in the case of the other pole of the pole pair, are disposed so as to be magnetized radially inwards. In addition, because each pole is cambered radially outwards, exceptionally reduced cogging torque is achievable, resulting in an electromotive system particularly easy to control.

To be understood by the term camber in this context is that the respective pole has an outside diameter increasing in the circumferential direction from its first pole edge up to its other pole edge and then decreasing again. In this connection, it is true that the permanent-magnetic material of a pole may be realized in one piece and therefore cambered and, in the process, smoothly curved. However, it is painstaking and therefore costly to produce such a one-piece, cambered, permanent-magnetic body. Alternatively, the cambered structure may also be realized using individual permanent magnets, the centers of mass and/or midpoints of the permanent magnets being disposed along an imaginary cambered line. Preferably, the line is a segment of a circular arc. Thus, in the case of cuboidal permanent magnets, a cambered imaginary line is also present, which in each instance connects at least one edge of each permanent magnet. Preferably, this line is also a circular-arc segment.

To realize the camber, an outer-surface segment of one permanent magnet is disposed at a greater or smaller radial distance than the corresponding outer-surface segment of a permanent magnet of the same pole directly adjacent in the circumferential direction. The camber is thus realized in discrete fashion.

The circumscribing radial distance of the outer surface of the respective pole may decrease in the circumferential direction from the middle of the pole, especially up to the pole edge lying outside in the circumferential direction, in particular, the circumscribing circle being that which does not cut, but rather only touches the permanent magnets, thus, has only one or two points of intersection with the respective permanent magnet. This is advantageous because an easily producible circular camber is thus able to be realized.

Each pole may have two or more permanent magnets, in particular, the permanent magnets being substantially identical, each permanent magnet in particular being cuboidal. The advantage is that an especially simple manufacture is feasible, since cuboidal permanent magnets may be produced easily and cost-effectively. To produce the pole, the permanent magnets thus only have to be bonded on suitably even surface sections of the laminated core, the laminated core being formed such that the camber of the pole is achieved, even though the permanent magnets are cuboidal and substantially identical.

The permanent magnets may be disposed on a laminated core made of stacked individual laminas, in particular each permanent magnet being mounted on a flat surface section of the laminated core and bonded to it, the surface element extending in the stack direction and transversely to it. This offers the advantage of permitting a simple manufacture. In particular, adhesive bonding of the permanent magnets to the laminated core is easily practicable.

The slot number $N_1$ of the stator may be selected such that the inequation $$\alpha_P \times N_1 \neq 2 \times p \times N_M$$

is satisfied, in which $\alpha P$ is the pole pitch, p is the number of pole pairs and $N_M$ is the number of permanent magnets per pole. This offers the advantage that cogging torque due to the slotting and/or poles may be reduced. Thus, torque ripple is reduced and the synchronous motor is better able to be controlled.

The camber may have a camber radius $R_{pa}$ which is more sharply curved than the radius $D_{i1}/2$ of the receiving opening in the stator, in particular so that the following applies:

$$R_{pa} < -\delta + D=/2,$$

in which $\delta$ is the air gap between the maximum outside radius of the rotor and the minimum inside radius of the mounting opening in the stator for accommodating the rotor and $D_{i1}$ is the diameter of the mounting opening in the stator for accommodating the rotor. The advantage in this context is that the pole is cambered, thus, has a sharper curvature than a circle, whose midpoint lies on the rotor axis and whose radius touches the point of the pole surface lying at the greatest radial distance.

The following may apply for the pole pitch:
$0.8 \leq \alpha_p \leq 0.85$. This offers the advantage that again, the cogging torque and torque ripple of the synchronous motor are reducible.

The maximum air gap, occurring at the pole edges, between the pole and the mounting opening may be selected such that the following applies:

$$2 \times \delta \leq \delta_{max} \leq 3 \times \delta,$$

particularly so that the camber thus extends radially over less than double the air gap, but at least over a radial-distance area corresponding to the air-gap distance. This is advantageous because cogging torque due to the slotting is again reducible.

In the axial direction, the pole may have two substantially identical sections, between which there is an offset in the circumferential direction that amounts to an offset angle of $180°/KGV(N_1, 2\times p)$, in which KGV denotes the smallest common multiple, $N_1$ denotes the stator slot number and p denotes the number of poles. This is advantageous because torque ripple and cogging torque of the synchronous motor due to the slotting are reducible.

The stack direction of the laminated core may be the axial direction. This is advantageous because the flat joining surface is able to be produced by adhesive agent which clings, as it were, in surface roughness present in the stack direction. In this manner, the joining strength is able to be increased.

The poles may have a continuous or discretely approximate angle of inclination in the axial direction. This has the advantage that torque ripple and cogging torque of the synchronous motor due to the slotting are reducible, and in turn, improved controllability of the synchronous motor is thus attainable.

It should be understood that present invention is not limited to the feature combination described below. Further beneficial combination possibilities of features of the specification and/or of the FIGURES should become apparent from the following discussion for one skilled in the art.

Example embodiments of the present invention explained in greater detail below with reference to FIG. 1.

DETAILED DESCRIPTION

FIG. 1 shows the rotor of a synchronous motor, the rotor shaft able to be accommodated in a central opening 9 being left out.

Disposed on the rotor shaft, which is insertable in opening 9, is a laminated core 7 that is made up of joined individual laminas, preferably punch/stacked and/or welded.

Permanent magnets (1, 2, 3, 4, 5, 6) are disposed at the outer circumference of laminated core 7, one magnetic pole being formed from a plurality of permanent magnets (1, 2, 3, 4, 5, 6). In FIG. 1, each pole is formed of six permanent magnets (1, 2, 3, 4, 5, 6).

In each case gaps are located between the poles in the circumferential direction.

With the aid of the multi-piece construction of a pole, thus, the formation of each pole from six permanent magnets (1, 2, 3, 4, 5, 6), eddy-current losses are reduced.

Permanent magnets (1, 2, 3, 4, 5, 6) are magnetized in the radial direction.

Each pole has a maximum outside radius, which is centrally located in the angular range of the pole in the circumferential direction.

From the circumferential position of the maximum outside radius up to the respective gap adjoining the pole, the outside radius of the pole decreases. The outer envelope curve of the pole is thus cambered on both sides in the circumferential direction.

In this context, each pole is made up of six individual permanent magnets, which are adhesively bonded on the laminated core. Each permanent magnet is cuboidal and is stuck on a flat outer surface of laminated core 7 provided specifically for it. The radial outer surface of laminated core 7 is thus polygonal in the area of the pole in a cross-section, the normal to the sectional plane being aligned in the axial direction, in the respective flat area of the polygon, an adhesive surface extending in the axial direction.

The number of permanent magnets per pole is thus $N_M=6$. The rotor has the number of pole pairs p=3, thus, $2\times p=6$ individual poles at the circumference of the rotor.

The stator slot number $N_1$ is selected such that the inequation $$\alpha_p \times N_1 \neq 2 \times p \times N_M$$

is satisfied. Thus, cogging torque due to the slotting is as little as possible.

The rotor is disposed in the stator, the opening in the stator accommodating the rotor having a diameter $D_{i1}$. At least one air gap $\delta$ exists between the opening and the rotor. The air gap is minimal at the maximum radius of the pole, thus has the value $\delta$ at that location.

The radius $R_{pa}$ circumscribing the camber is selected such that the following applies:

$$R_{pa} < -\delta + D_{i1}/2.$$

The camber, thus the curved profile, of the pole in the circumferential direction is thus more sharply curved than the circumference of the rotor. Therefore, the outside radius decreases from the center of the pole in the circumferential direction up to the pole edges.

That is why air gap $\delta$ in the area of the pole edges which adjoin the gaps assumes a maximum value $\delta_{max}$.

Especially low cogging torques are obtained if the following dimensioning conditions are satisfied:

$$0.8 \leq \alpha_P \leq 0.85$$

and $$2 \times \delta \leq \delta_{max} \leq 3 \times \delta.$$

With the aid of the arrangements described herein, substantially identical cuboidal permanent magnets are always usable as permanent magnets, permitting easy manufacture of the rotor.

To accommodate the rotor shaft, laminated core 7 has a centrally located opening 9 for the rotor shaft, and additionally, has openings 8 for reducing the moment of inertia, openings 8 being centrally located relative to the poles in the circumferential direction and being evenly spaced from each other in the circumferential direction.

Openings 8, set apart uniformly from each other in the circumferential direction, are provided in the laminated core of the rotor to reduce the moment of inertia, their maximum extension in the radial direction in each case being located in the center, determined in the circumferential direction, of a respective assigned pole, the number of poles being equal to the number of openings 8, the radial extension of openings 8 in the circumferential direction extending symmetrically relative to the respective pole center determined in the circumferential direction, the cross-section of a respective opening 8 corresponding to a rounded-off triangle. Thus, an advantageous profile is achieved not only for the moment of inertia, but also for the magnetic flux.

In order to further reduce cogging torque, in the axial direction, a substantially identical construction of the rotor is provided which, however, has an offset in the circumferential direction. In this context, advantageously an offset of the poles with an offset angle of $180°/KGV(N_1, 2\times p)$ is selected, KGV denoting the smallest common multiple, particularly of N1 and the number of poles. In further refinement, other surface-mounted parts set apart axially may also be provided which have a specific offset angle relative to each other, or corresponding surface-mounted parts having a continuous angle of inclination are also permitted. In the case of the discrete implementation, each axially subsequent area is in a position rotated in the circumferential direction by an offset angle relative to the area preceding it axially.

LIST OF REFERENCE SYMBOLS 1 permanent magnet of the first pole
2 permanent magnet of the second pole
3 permanent magnet of the third pole
4 permanent magnet of the fourth pole
5 permanent magnet of the fifth pole
6 permanent magnet of the sixth pole
7 laminated core
8 opening for reducing the moment of inertia
9 opening for accommodating the rotor shaft
$R_{pa}$ radius circumscribing the camber of the pole
$\delta$ air gap
$\delta_{max}$ maximum air gap
$N_M$ number of permanent magnets per pole
p number of pole pairs
$N_1$ stator slot number
$\alpha_P$ pole pitch

What is claimed is:

1. A synchronous motor, comprising:
   a stator having a stator winding; and
   a rotor including magnetic poles, each pole being formed of a plurality of permanent magnets;
   wherein each pole has a cambered outer contour, circumscribing the permanent magnets and cambered radially outwardly.

2. The synchronous motor according to claim 1, wherein each pole, in an area of the cambered outer contour, has a local maximum radial distance as a function of an angle at circumference, such that each pole has a maximum radial distance that is greater than a maximum radial distance of the rotor in an angle-at-circumference area between two poles immediately adjacent in a circumferential direction.

3. The synchronous motor according to claim 1, wherein 2×p poles are salient in a circumferential direction, p being a number of pole pairs.

4. The synchronous motor according to claim 1, wherein a circumscribing outside radius of the respective pole decreases in the circumferential direction from the center of the pole, up to the pole edge lying outside in the circumferential direction, wherein the circumscribing radius is a radius that does not cut, but rather only touches the permanent magnets, and has only one or two points of intersection with the respective permanent magnet.

5. The synchronous motor according to claim 1, wherein: all permanent magnets of all poles are substantially identical geometrically; the permanent magnets are magnetized differently; and/or each permanent magnet is cuboidal.

6. The synchronous motor according to claim 1, the permanent magnets are arranged on a laminated core made of stacked individual laminas, each permanent magnet being mounted on a flat surface section of the laminated core and bonded to it, the surface element extending in the stack direction and transversely to it.

7. The synchronous motor according to claim 1, wherein a slot number $N_1$ of the stator satisfies the relationship:

$$\alpha_P \times N_1 \neq 2 \times p \times N_M$$

in which $\alpha_P$ represents a pole pitch, p represents a number of pole pairs, and $N_M$ represents a number of permanent magnets per pole.

8. The synchronous motor according to claim 1, wherein the camber has a camber radius $R_{pa}$ which is smaller than a radius $D_{i1}/2$ of a mounting opening in the stator, and the camber is more sharply curved than the mounting opening in the stator, such that the following relationship is satisfied:

$$R_{pa} < -\delta + D_{i1}/2,$$

in which $\delta$ represents an air gap between a maximum outside radius of the rotor and a minimum inside radius of the mounting opening in the stator for accommodating the rotor and $D_{i1}$ represents the diameter of the mounting opening in the stator for accommodating the rotor.

9. The synchronous motor according to claim 7, wherein the following relationship is satisfied for pole pitch $0.8 \leq \alpha_p \leq 0.85$.

10. The synchronous motor according to claim 8, wherein a maximum air gap, occurring at pole edges, between the pole and a mounting opening satisfies the following relationship:

$$2 \times \delta \leq \delta_{max} \leq 3 \leq \delta,$$

so that the camber extends radially over less than double the air gap.

11. The synchronous motor according to claim 1, wherein, in an axial direction, the pole has two substantially identical sections, between which is an offset in a circumferential direction that amounts to an offset angle of $$180°/KGV(N_1, 2 \times p), \text{ in which}$$

KGV represents a smallest common multiple, $N_1$ represents a stator slot number, and p represents the number of poles.

12. The synchronous motor according to claim 1, wherein a stack direction of a laminated core is in an axial direction.

13. The synchronous motor according to claim 1, wherein the poles have a continuous or discreetly approximate angle of inclination in an axial direction.

14. The synchronous motor according to claim 1, wherein a first, non-trivial, non-vanishing order of a multipole expansion of a cross-section of the rotor corresponds to a number of poles of the rotor.

15. The synchronous motor according to claim 1, wherein a first, non-trivial, non-vanishing order of the multipole expansion of a cross-section of the rotor corresponds to a number of poles of the rotor, and/or a first, non-trivial, non-vanishing, higher magnetic multipole moment of the rotor corresponds to the number of poles of the rotor.

16. The synchronous motor according to claim 1, wherein a radial distance of the outer contour of the rotor is a non-constant, periodic function of an angle at circumference, a number of local maxima of the function corresponding to the number of poles at the circumference of the rotor.

17. The synchronous motor according to claim 1, wherein openings, set apart uniformly from each other in an circumferential direction, are provided in a laminated core of the rotor to reduce the moment of inertia, a maximum extension in the radial direction in each case being located in a center, determined in the circumferential direction, of a respective assigned pole, a number of poles being equal to a number of openings, a radial extension of the openings in the circumferential direction in particular extending symmetrically relative to the respective pole center determined in the circumferential direction, a cross-section of a respective opening corresponding to a rounded-off triangle.

* * * * *